United States Patent [19]
Barton et al.

[11] 3,817,988
[45] June 18, 1974

[54] PROCESS FOR 11,12-ENOLISATION OF 9A-HALO-11-KETO-STEROIDS

[75] Inventors: Derek Harold Richard Barton, London, England; Robert Henry Hesse, Cambridge, Mass.

[73] Assignee: Research Institute for Medicine and Chemistry, Inc., Cambridge, Mass.

[22] Filed: Nov. 16, 1971

[21] Appl. No.: 199,299

[52] U.S. Cl............260/239.55 C, 260/239.55 D, 260/397.45, 424/241

[51] Int. Cl........................................ C07c 173/00
[58] Field of Search........................... 260/239.55 C Primary Examiner—Elbert L. Roberts
Attorney, Agent, or Firm—Bacon & Thomas

[57] ABSTRACT 11,12-Enolisation of 9α-halo-11-keto-steroids is accomplished by treating 9α-halo-11-keto-steroids in polar, aprotic solvents with strong bases.

9 Claims, No Drawings

PROCESS FOR 11,12-ENOLISATION OF 9A-HALO-11-KETO-STEROIDS

This invention is concerned with novel steroid enolates and processes for their preparation and their use as intermediates.

We have found that 11,12-enolates of 9α-halo-11-keto-steroids can readily be prepared and, if necessary, isolated and further that these new compounds can serve as starting materials for a number of very useful synthetic procedures. The new enolates may be prepared from the 9α-halo-11-ketones by treatment with a strong base, in spite of the fact that they are α-haloketones and would therefore be expected to undergo the Favorskii rearrangement with ring contraction or nucleophilic replacement of the halogen atom accompanied by transposition of the substituent from one side of the carbonyl group to the other.

The new enolates are preferably alkali metal enolates, more especially sodium, potassium or lithium enolates, or magnesium enolates, although any cation which is sufficiently electrophilic to form the enolate is suitable. As is explained below, the lithium and magnesium enolates are especially preferred due to their reluctance to undergo metathesis with keto groups in subsequent reactions and hence their avoidance of side-reactions and multiple products.

The 9α-halo-11-keto steroids are preferably 9α-chloro- and more preferably 9α-fluoro-steroids.

In addition to the 11-keto group, the steroid substrate may carry advantageously a 3-substituent which is convertible into a 3-keto group, for example an enol ether or ester group, a hydrazone or substituted hydrazone group, an oxime or alkoxime group, or a dialkylketal or cyclic ketal group such as a dioxolan group. Such groups can be converted into the 3-keto group, where this is required, by conventional means. An unprotected 3-keto group may be present in conjunction with a 6-fluoro-1,4-diene system since the keto group does not then readily enolise.

If a 3-keto-1,4-diene is used, a 1,3,5-enolate is usually formed first but will rearrange to the desired 11,12-enolate with regeneration of the $\Delta^{1,4}$-3-keto system if the base is a sodium or potassium base and is added slowly to the steroid.

Double bonds may be present, for example at the 1,2-, 3,4-,4,5- and/or 16,17-positions and alkyl groups, for example methyl groups, may be present at the 6- and/or 16-position, (in the α- or β-configuration), or in the 10- or 13-position. Halogen atoms may be present at the 6- or 16-position. The 17-position may carry a keto group or alternatively a hydrogen atom, a hydroxyl group or an acyloxy group together with a hydrogen atom or an aliphatic group, preferably with one to eight carbon atoms, which may, for example, carry one or more keto and/or hydroxy or acyloxy substituents, provided that any hydroxy groups or keto groups are protected, for example as esters or ethers or as ketals, hydrazones, or dioxolans respectively. The corticoid side chain (17α-hydroxy-17β-hydroxyacetyl) is especially valuable and may advantageously be protected by a bis-methylene dioxide grouping or the formation of 17,21-diesters or orthoesters. Where esters of hydroxyl compounds are used, these are preferably derived from aliphatic acids having one to six carbon atoms, e.g. acetic or propionic acid, or aromatic acids such as benzoic acid. Hydrazone derivatives include, for example, dialkyl hydrazones such as dimethylhydrazone, or semicarbazide. Alkoximes include for example, methoximes.

The new enolates may be prepared by 11,12-enolisation of a corresponding 9α-fluoro-11-keto steroid by treatment in a polar, aprotic medium with a strong base, for example an alkali metal hydride, aluminium-hydride, amide, alkylamide, silylamide, acetylide or substituted acetylide, alkyl or amine-modified alkyl. A sodium or potassium triarylmethyl can also be used where the 3-keto-$\Delta^{1,4}$-system is present; in that case alkali metal exchange with the 11-keto group yields the desired 11,12-enolate. Such reagents do not, however, normally form an 11,12-enolate directly. The strong base should, of course, be a stronger base than the desired enolate; that is the protonated derivative from which the base is derived, for example an amine or acetylene, should be a weaker acid than the enol form of the 11-ketone.

The alkali metal base may, for example, be a sodium, potassium or lithium derivative. In alkylamides or alkylsilylamides the amine portion can be defined as $NR^1R^2$ where $R^1$ and $R^2$, which may be the same or different, are alkyl groups or trialkylsilyl, triaralkyl or triarylsilyl groups. The alkyl groups in such compounds advantageously have one to six carbon atoms and may, for example, be methyl, ethyl, propyl or hexyl groups. Branched alkyl groups such as isopropyl groups are preferred in the alkylamides. Aralkyl groups are preferably monocyclic groups with one to six carbon atoms in the alkyl portion, for example benzyl or phenethyl groups. Aryl groups are preferably monocyclic, for example phenyl or tolyl groups. The branched alkylamides and the silylamides, and particularly diisopropylamides and bis-trimethylsilylamides, give the most satisfactory results from the point of view of reactivity and cleanness of reaction. Lithium diisopropylamide is especially useful. It is also convenient to use a mixture of a lithium alkyl, e.g. butyl lithium, with an amine such as diisopropylamine.

Triarylmethyl groups preferably carry monocyclic aryl groups such as phenyl or tolyl groups. Alkali metal alkyls include, for example, butyls, such as lithium butyl. There are preferably one to five carbon atoms in each alkyl group.

The formation of the 11,12 enolate from the 11-one is effected in a polar, aprotic medium, preferably a solvent serving to solvate alkali metal cations. Suitable solvents include ethers and cyclic ethers such as tetrahydrofuran and dimethoxyethane, amides such as tetramethylurea, dimethylformamide, dimethylacetamide, hexamethylphosphoramide, and N-methylpyrrolidine and sulphones and sulphoxides such as sulpholan and dimethylsulphoxide. In general an amide or ethereal solvent is preferred.

Completion of the reaction may be monitored by removing an aliquot from the reaction mixture, treating it with benzoic anhydride and determining the product composition by n.m.r. or thin layer chromatography.

Sodium or potassium enolates are, in general, more readily prepared by the above method than lithium enolates but tend to undergo methathesis with other ketones whereby the enolates of the latter are formed and enter simultaneously into subsequent reactions. Thus, for example, although it is often convenient or synthetically advantageous to prepare the sodium 11,12-enolate, this enolate must be fluorinated rapidly and in very dilute solution or otherwise it undergoes metathesis with the product 9,12-difluoro-11-keto steroid to afford a mixture of 9-fluoro-11-keto steroid and 9,12-difluoro-11,12-enolate. This, of course, leads to the isolation of mixtures of mono-, di- and tri-fluorinated ketones and spoils the reaction from a preparative point of view. Lithium or magnesium enolates do not rearrange quickly enough to present this difficulty and it has been found surprisingly and fortunately that it is possible to convert the easily formed sodium enolate into a lithium enolate by the simple expedient of treating the former in solution with a solution of lithium chloride e.g. in tetrahydrofuran. A rapid cation exchange ensues and sodium chloride is precipitated leaving behind a solution of the 11,12-lithium enolate which may then be fluorinated without difficulty. This same process may indeed be useful when carrying out other reactions which lead to substitution of the enolate at the 12-position.

Where a lithium enolate is required it is also sometimes convenient to cleave an 11,12-enol ester, e.g. the benzoate, with a lithium base such as an alkyl, amide or hydride. It is also possible to cleave a $\Delta^{9(11)}$-11-trialkylsilyloxy ether with an alkyl lithium. A magnesium enolate may be generated by cleavage of a $\Delta^{9(11)}$-11-trialkylsilyloxy ether or ester with a Grignard reagent for example an aliphatic, araliphatic or aromatic magnesium halide.

The solutions of the new 11,12-enolates in polar, aprotic solvent media are very versatile reagents and constitute a further feature of the invention. The enolates themselves, in general, are relatively unstable out of solution and there is normally no advantage in isolating them before subsequent reactions are effected, such as formation of enol ethers and esters or 12-halides. In general, 12-halogenated steroids show enhancement of physiological activity as compared with unsubstituted analogues, particularly in the corticoid field where the products are antiinflammatory agents, and in the 20-ketopregnane and oestrane field where the products exhibit progesterone-like activity.

Enol esters may be produced by reacting the enolate with an acylating agent, e.g. a reactive derivative of an acid, e.g. a halide or, more particularly, an anhydride of an organic acid such as an aliphatic, araliphatic or aromatic acid, e.g. acetic, propionic or benzoic acid.

Enol silyl ethers may be prepared by reaction with an etherifying reagent, e.g. a dialkyl or trialkyl silyl halide such as trimethylmonochlorosilane or dimethyldichlorosilane.

12-Helogenation may be effected by reaction with a source of positive halogen, for example molecular chlorine or bromine. It is particularly useful to introduce a 12-fluorine atom by reaction with an electrophilic fluorinating agent such as perchloryl fluoride, or a hypofluorite reagent such as trifluoromethyl hypofluorite.

Electrophilic fluorinating agents such as perchloryl fluoride give initially 9α-halo-12-fluoro-11-ketosteroids. These latter compounds may, however, be further converted to their 11,12-enolates which can then be further reacted with fluorinating reagents to give the corresponding 9α-halo-12,12-difluoro-11-ketosteroids.

The 9,12-difluoro Δ(11,12) enolates may also be treated with acid to afford 9,12-difluoro 11-keto steroids isomeric with the parent 9,12-difluoro 11-keto compound. Direct perchloryl fluoride fluorination of the 9-fluoro Δ(11,12) enolate leads to the thermodynamically more stable 9,12-difluoro ketone which on enolization and protonolysis is isomerized to the thermodynamically less stable derivative.

The 9-halo-12-fluoro-11-ketosteroids initially prepared may, for example, be reduced to the corresponding 11-hydroxysteroids, e.g. by conventional methods. Thus, for example, 9α,12,12-trifluorocortisone 17α,20:20,21-bismethylene dioxide 3-ethylene ketal may be reduced to give the corresponding cortisol, for example using a borohydride reducing agent such as sodium borohydride.

The 9,12,12-trifluoro-11-oxygenated steroids which may be produced by the above methods are new compounds and constitute a feature of the present invention.

The following Examples are given by way of illustration only: all reaction were effected using freshly distilled solvents under an atmosphere of argon:-

EXAMPLE 1

Preparation of 9α-fluorocortisone 17α,20:20,21-bimethylenedioxide 3-ethylene ketal 11,12-enol benzoate.

9α-Fluorocortisone 17α,20:20,21-bismethylene dioxide 3-ethylene ketal (400 mg.) was dissolved in freshly distilled hexamethylphosphoramide (H.M.P.A.) under an atmosphere of argon and a 20 percent suspension of sodium acetylide in hexane (0.8 ml.) was added. The mixture was stirred for fifteen minutes and then benzoic anhydride (0.8 g.) in H.M.P.A. (10 ml.) added; the solution was stirred for five minutes more and poured into water. The aqueous solution was extracted with ether and the ether layer separated and dried ($MgSO_4$). Evaporation of the ether layer to dryness gave an oil containing excess benzoic anhydride and the product.

Chromotography on alumina and elution with benzene gave 250 mg.) of title product as a clean colorless oil which could only be induced to crystallize in very poor yield. It was however pure to t.l.c. and N.M.R.

I.R. Absorption maximum

Carbonyl stretch 1745 $cm^{-1}$, V.S.
C-O stretch 1250 $cm^{-1}$, V.S.
N.M.R.
5 proton multiplet 7-8$\delta$, 1 proton doublet at
6.55$\delta$ (J = 2.5 cps.)
19 methyl 1.25$\delta$, 18 methyl at 1.05

EXAMPLE 2

Preparation of 9α-fluorocortisone 17α,20:20,21-bismethylene dioxide 11,12- enol benzoate 3-methyl enol-ether (I)

Hexamethyldisilazane (400 mg.) was dissolved in a 4:1 mixture of benzene and H.M.P.A. and 2 mg. of triphenylmethane added as an indicator. n-Butyl lithium was then added until a pale pink colour indicated a small excess. Half this solution was then added to 9α-fluorocortisone 17α,20:20,21-bismethylene dioxide 3-methyl enol-ether, (200 mg.) the solution stirred for 15 minutes and benzoic anhydride (400 mg.) in H.M.P.A. (5 ml.) added. The reaction products were poured into water, extracted with ether and the ether layer separated and dried ($MgSO_4$). Evaporation of the ether and chromatography of the residue gave 110 mg. of title compound as a colourless oil which could not be crystallized.

I.R. Absorption maximum
Carbonyl at 1745 cm$^{-1}$, V.S.
C-O, 1250 cm$^{-1}$, V.S.
N.M.R.
5 proton multiplet 7.8$\delta$, 1 proton doublet 6.5$\delta$ (J = 2.5 cps)
19 methyl 1.18$\delta$, 18 methyl 1.05$\delta$

EXAMPLE 3

Preparation of 9$\alpha$-fluorocortisone 17$\alpha$,20:20,21-bismethylene- dioxide 11,12-enol benzoate 3-methyl enol-ether (II)

9$\alpha$-Fluorocortisone 17$\alpha$,20:20,21-bismethylene dioxide 3-methyl enol-ether (400 mg.) was dissolved in tetrahydrofuran (T.H.F.) (10 ml.) and sodium bistrimethylsilyl amide (400 mg.) in T.H.F. (10 ml.) added. The solution was stirred for five minutes and benzoic anhydride (520 mg.) in T.H.F. (10 ml.). Work-up as in Example 1 gave 320 mg. of title compound as a colourless oil.

EXAMPLE 4

Preparation of 9$\alpha$-Fluoro-17$\alpha$,21-dihydroxy-16$\alpha$-methyl-3,11,20-trioxopregna-1,4-diene 17$\alpha$,20:20,21-bismethylene dioxide 11,12-enol benzoate.

9$\alpha$-Fluoro-17$\alpha$,21-dihydroxy-16$\alpha$-methyl-3,11,20-trioxopregna-1,4-diene 17$\alpha$,20:20,21-bismethylene dioxide (400 mg.) was dissolved in T.H.F. (10 ml.) and sodium bistrimethyl silyl amide (400 mg.) in T.H.F. (10 ml.) added over two hours. Benzoic anhydride (520 mg.) in T.H.F. (10 ml.) was added and the solution was worked up as in Example 1.

Chromatography on alumina gave 180 mg. of the title compound as a crystalline product.

EXAMPLE 5

Reaction of the sodium enolate of 9$\alpha$-fluorocortisone 17$\alpha$,20:20,21-bismethylene dioxide 3-ethylene ketal with perchloryl fluoride.

9$\alpha$-Fluorocortisone 17$\alpha$, 20:20,21-bismethylene dioxide 3-ethylene ketal (500 mg.) was dissolved in T.H.F. (10 ml.) and sodium bistrimethyl silyl amide (500 mg.) in T.H.F. (10 ml.) added. The solution was stirred for 5 minutes, cooled to 0°C and perchloryl fluoride passed in until a potassium iodide trap indicated an excess. Argon was then passed through the solution for 20 minutes to remove dissolved perchloryl fluoride, the solution poured into a potassium iodide/ice mixture, the iodine produced removed with sodium thiosulphate solution, the mixture stirred until all the ice melted and the product filtered off. Product analysis showed it to contain approximately equal amounts of mono, di and trifluoro cortisone 17$\alpha$,20:20,21-bismethylenedioxide 3-ethylene ketal.

EXAMPLE 6

Preparation of the lithium enolate of 9$\alpha$-fluorocortisone 17$\alpha$,20:20,21-bismethylene dioxide 3-ethylene ketal and its reaction with perchloryl fluoride 9$\alpha$-Fluorocortisone 17$\alpha$,20:20,21-bismethylene dioxide 3-ethylene ketal (500 mg.) was treated with sodium bistrimethyl silyelamide as before and then lithium chloride (100 mg.) in T.H.F. (5 ml.) was added. Sodium chloride was precipated and the lithium enolate formed. This was reacted with perchloryl fluoride and work up as in Example 5 gave 360 mg. of 9$\alpha$,12$\beta$-difluorocortisone 17$\alpha$,20:20,21-bismethylene dioxide 3-ethylene ketal.
M.Pt.
260°-262°C
I.R. Absorption maximum
1750 cm$^{-1}$
N.M.R.
¼ proton doublet (J = 5 cps.)6.03$\delta$, 19 and 18 methyls at 1.3 and 0.85$\delta$
ANALYSIS C$_{25}$H$_{32}$O$_7$F$_2$
Req: percent C = 62.2 H = 6.64 F = 7.88
Found: 62.42 6.63 7.29

EXAMPLE 7

Preparation of 9$\alpha$,12,12-trifluorocortisone 17$\alpha$,20:20,21-bis-methylene dioxide 3-ethylene ketal.

9$\alpha$,12$\beta$-difluorocortisone 17$\alpha$,20:20,21-bismethylenedioxide 3-ethylene ketal (500 mg) was dissolved in T.H.F. (10 ml. and sodium bismethyl silyl amide (500 mg.) in T.H.F. (10 ml.) added. The solution was cooled to 0°C and perchloryl fluoride passed in. Work up as in Example 5 followed by crystallization gave 210 mg. title compound.
M.Pt.
239°–245° $\alpha]_D$ = -87.4° (approximately)
I.R. Absorption maximum
1755 cm$^{-1}$
ANALYSIS: C$_{25}$H$_{31}$O$_7$F$_3$
Req: percent C = 59.9 H = 6.25 F = 11.38
Found: 59.7 6.7 12.20

EXAMPLE 8

Reduction of 9$\alpha$,12,12-trifluorocortisone 17$\alpha$,20:20,21-bismethylene dioxide 3-ethylene ketal 9$\alpha$,12,12-trifluorocortisone 17$\alpha$,20:20,21-bismethylenedioxide 3-ethylene ketal (500 mg.) dissolved in T.H.F. (3 ml.) and 2-propanol (2 ml.) and sodium borohydride (200 mg.) in water (2 ml.) was added. The solution was allowed to stand for 90 minutes at room temperature, poured into water (50 ml.) and extracted with 2 × 10 ml. of ether. The ethereal extract was washed with 5 percent sodium bicarbonate solution, saturated sodium chloride solution and dried with sodium sulfate. Evaporation to dryness and crystallization from methylene chloride/methanol containing 0.1 percent pyridine gave 280 mg. of 9,12,12-trifluorocortisol 17$\alpha$,20:20,21-bismethylene dioxide 3-ethylene ketal.

| M.Pt. 239–240°C. | | | |
|---|---|---|---|
| Analysis: | %C | %H | %F |
| C$_{25}$H$_{33}$O$_7$F$_3$ requires: | 59.75 | 6.62 | 11.34 |
| Found: | 59.76 | 6.98 | 11.08 |

EXAMPLE 9

Preparation of 9$\alpha$,12,12-trifluorocortisol 17$\alpha$,20:20,21-bismethylene dioxide 9$\alpha$,12,12-trifluorocortisol 17$\alpha$,20:20,21-bismethylene dioxide 3-ethylene ketal (200 mg.) was dissolved in 1 percent HCl in acetone and allowed to stand for an hour at room temperature. Water was added, the product filtered and recrystallization from methylene chloride/ether gave 110 mg. of 9$\alpha$,12,12-trifluorocortisol BMD. M.Pt. 286°–290°C.

EXAMPLE 10

Preparation of 9α,12,12-trifluorocortisol

9α,12,12-trifluorocortisol 17α,20:20,21-bismethylene dioxide (90 mg.) was dissolved in concentrated HCl (1 ml.) and shaken for 1 minute. Water was added, the precipitate filtered off and crystallization from pyridine/methanol gave 38 mg. of 9α,12,12-trifluorocortisol.

M.Pt. 260°–266°C.

EXAMPLE 11

Preparation of 12β-bromo-9α-fluorocortisol 17α,20:20,21-bismethylene dioxide 3-ethylene ketal 9α-Fluorocortisone 17α,20:20,21-bismethylene dioxide 3-ethylene ketal (1 g.) dissolved in THF (15 ml.) and sodium bistrimethyl silyl amide (1 g.) in THF (15 ml.) added. The solution was stirred for 5 minutes, lithium chloride (200 mg.) in THF (20 ml.) was added and the solution stirred for a further 5 minutes. Bromine (0.25 ml.) was added, the solution poured into water, extracted with ether and worked up. The crude mixture was treated with sodium borohydride in THE/water/isopropanol for 1 hour, extracted with ether and worked up. Chromatography gave 410 mg. of 12β-bromo-9α-fluorocortisol BMD 3-ethylene ketal.

M.Pt. 184°–5°C

| Analysis: | | | | |
|---|---|---|---|---|
| Found: | % C=54.98 | H=6.30 | F=3.48 | Br=14.4 |
| Required: | 55.05 | 6.28 | 3.48 | 14.65 |

EXAMPLE 12

Preparation of 9α-fluorocortisone 17α,20:20,21-bismethylene dioxide 3-ethylene ketal Δ trimethylsilyl enol-ether a. Preparation of n-butyl lithium/di-isopropylamine reagent n-Butyl lithium (10 m.mol:2.38M solution in hexane) was added to THF (5 ml.) containing 2 mg. of triphenylmethane as an indicator. Diisopropylamine (10 m.mol) in THF (5 ml.) was added and the solution stirred for 5 minutes. It was then used as such.

b. Use of reagent: 9α-Fluorocortisone 17α,20:20,21-bismethylene dioxide 3-ethylene ketal (460 mg.) was dissolved in THF (25 ml.) and the n-butyl lithium/diisopropylamine solution prepared above was added until there was a permenent pink color. Trimethylsilyl chloride (0.12 ml.) was added, the solution poured into ether and worked up. Crystallization from ether gave 410 mg. of 9α-fluorocortisone BMD 3-ethylene ketal Δ[11] trimethylsilyl enol-ether.

M.Pt.176°–8°C $[\alpha]_D = -124.6°$

Analysis: Found: % C=62.91  H=7.8  F=3.69

Required: 62.9  7.8  3.55 c. The same reaction using 12β-difluoro cortisone 17α,20:20,21-bismethylene dioxide 3-ethylene ketal gave 9α,12-difluorocortisone BMD 3-ethylene ketal Δ[11] trimethylsilyl enol-ether. M.Pt. 174°–6°C $[\alpha]_D = -116°$

| Analysis: | %C | %H | %F |
|---|---|---|---|
| Found: | 60.88 | 7.16 | 6.52 |
| Required: | 60.84 | 6.93 | 6.87 |

We claim:

1. A process for the 11,12-enolisation of a 9α-halo-11-keto-steroid of the pregnane series in which the 9α-halo-11-keto-steroid is treated in a polar, aprotic medium with a strong base selected from the group consisting of the hydrides, aluminum hydrides, amides, alkylamides, silylamides, acetylides, substituted acetylides, and alkyl or amine-modified alkyls of the alkali metals.

2. A process as claimed in claim 1 in which the amine portion of an alkylamide or alkylsilylamide is of the formula NR¹R² where R¹ and R² which may be the same or different are alkyl groups or trialkylsilyl, triaralkyl or triarylsilyl groups, each alkyl portion containing 1-6 carbon atoms.

3. A process as claimed in claim 1 in which the medium used is a polar aprotic solvent selected from the class consisting of ethers, cyclic ethers, amides, sulphones and sulphoxides.

4. A process as claimed in claim 1 in which a lithium enolate is prepared by treating a solution of an initially obtained sodium enolate with a solution of lithium chloride, the unwanted sodium chloride being precipitated.

5. A process as claimed in claim 1 in which the enolate obtained is converted into an enol silyl ether by reaction with a dialkyl or trialkylsilyl halide.

6. The process of claim 1 in which the 11,12-enolate obtained is reacted with a source of positive halogen selected from the group consisting of molecular chlorine, molecular bromine, perchloryl fluoride and trifluoromethyl hypofluorite to form a 9α-12-dihalo-11-keto steroid.

7. A process as claimed in claim 6 in which the enolate is the lithium enolate.

8. In the process of claim 1, the further step of converting the enolate obtained into an enol ester by reaction with a halide or anhydride of a carboxylic acid.

9. A solution of an 11,12-enolate of a 9α-halosteroid of the pregnane series in a polar, aprotic solvent selected from the group consisting of ethers, cyclic ethers, amides, sulphones and sulphoxides.

* * * * *